US008047222B2

(12) United States Patent
Lent et al.

(10) Patent No.: US 8,047,222 B2
(45) Date of Patent: Nov. 1, 2011

(54) AIR VALVE FOR AN AIR DRIVEN RECIPROCATING DEVICE

(75) Inventors: Gary K. Lent, Riverside, CA (US); Eric L Forman, Rancho Cucamonga, CA (US)

(73) Assignee: Wilden Pump and Engineering LLC, Grand Terrace, CA (US)

( * ) Notice: Subject to any disclaimer, the term of this patent is extended or adjusted under 35 U.S.C. 154(b) by 1228 days.

(21) Appl. No.: 10/968,859

(22) Filed: Oct. 18, 2004

(65) Prior Publication Data

US 2006/0082950 A1    Apr. 20, 2006

(51) Int. Cl.
*F16L 7/00* (2006.01)
(52) U.S. Cl. .................. 137/375; 137/625.66; 251/368
(58) Field of Classification Search .......... 137/375, 137/625.66; 251/368
See application file for complete search history.

(56) References Cited

U.S. PATENT DOCUMENTS

| 2,202,735 | A | * | 5/1940 | Johnson .................... 137/375 |
| 2,910,081 | A | * | 10/1959 | Karbowniczek ......... 137/625.68 |
| 3,026,899 | A | * | 3/1962 | Mischanski ................ 137/375 |
| 3,090,396 | A | * | 5/1963 | Rudelick .................... 137/375 |
| 3,113,591 | A | * | 12/1963 | Neuman et al. ............ 137/627.5 |
| 3,276,739 | A | * | 10/1966 | Freed ........................ 251/314 |
| 3,323,874 | A | * | 6/1967 | Phillips ..................... 251/368 |
| 3,334,650 | A | * | 8/1967 | Stewart, Jr. et al. .......... 137/375 |
| 3,342,205 | A | * | 9/1967 | Quinto ...................... 137/375 |
| 3,353,785 | A | * | 11/1967 | Eggers ...................... 251/175 |
| 3,580,286 | A | * | 5/1971 | Bash ....................... 137/625.68 |
| 3,883,114 | A | * | 5/1975 | Harris et al. ................ 251/366 |
| 4,267,862 | A | * | 5/1981 | Neff et al. ................ 137/625.66 |
| 4,549,467 | A |   | 10/1985 | Wilden et al. .................. 91/307 |
| 4,683,914 | A | * | 8/1987 | Brisland ................. 137/625.48 |
| 4,696,323 | A | * | 9/1987 | Iff ............................... 137/375 |
| 4,967,966 | A | * | 11/1990 | Babitzka et al. .......... 251/129.15 |
| 5,095,949 | A | * | 3/1992 | Day .......................... 137/625.69 |
| 5,267,670 | A | * | 12/1993 | Foster ........................... 222/1 |
| 5,361,803 | A | * | 11/1994 | Stoll ....................... 137/625.66 |
| 5,362,212 | A |   | 11/1994 | Bowen ......................... 417/395 |
| 5,421,367 | A | * | 6/1995 | Murata .................... 137/625.69 |
| 5,435,348 | A | * | 7/1995 | Nakamura et al. ......... 137/625.17 |
| 5,441,281 | A |   | 8/1995 | Baland et al. ................ 277/500 |
| 5,538,042 | A |   | 7/1996 | Baland et al. ............. 137/625.63 |
| 5,607,290 | A |   | 3/1997 | Duncan ..................... 417/393 |
| 5,611,678 | A |   | 3/1997 | Pascual ..................... 417/393 |
| 5,619,786 | A |   | 4/1997 | Baland ...................... 417/393 |
| 5,743,170 | A |   | 4/1998 | Pascual et al. .............. 92/103 F |
| 5,887,618 | A | * | 3/1999 | Grundby et al. .......... 137/596.18 |

(Continued)

FOREIGN PATENT DOCUMENTS

GB          2017265 A    * 10/1979

*Primary Examiner* — Craig Schneider
*Assistant Examiner* — Craig J Price
(74) *Attorney, Agent, or Firm* — Connolly Bove Lodge & Hutz LLP

(57) ABSTRACT

An air operated double diaphragm includes an air valve, air chambers, a center section between the air chambers, pump chambers and diaphragms between the air and pump chambers harnessed together with a piston rod. The air valve includes a statically dissipative body having a bore therein with a statically insulative liner in the bore. The statically insulative liner is fully enclosed within the statically dissipative body. A valve element is slidably positioned in the liner. The liner includes annular tenons to mate with annular mortises in the statically dissipative body and an end cap is used to close the valve cylinder.

1 Claim, 2 Drawing Sheets

U.S. PATENT DOCUMENTS

| | | | | |
|---|---|---|---|---|
| 5,927,954 A | | 7/1999 | Kennedy et al. | 417/397 |
| 5,957,670 A | | 9/1999 | Duncan | 417/395 |
| 5,992,822 A | * | 11/1999 | Nakao et al. | 251/129.15 |
| 6,102,363 A | | 8/2000 | Eberwein | 251/63 |
| 6,105,931 A | * | 8/2000 | Frank et al. | 251/129.15 |
| 6,142,749 A | | 11/2000 | Jack et al. | 417/395 |
| 6,152,705 A | | 11/2000 | Kennedy et al. | 417/395 |
| 6,158,982 A | | 12/2000 | Kennedy et al. | 417/397 |
| 6,168,394 B1 | | 1/2001 | Forman et al. | 417/395 |
| 6,257,845 B1 | | 7/2001 | Jack et al. | 417/395 |
| 6,357,723 B2 | | 3/2002 | Kennedy et al. | 251/322 |
| 6,435,845 B1 | | 8/2002 | Kennedy et al. | 417/395 |
| RE38,239 E | | 8/2003 | Duncan | 417/395 |
| 6,823,903 B2 | * | 11/2004 | Davis | 141/1 |
| 6,834,676 B2 | * | 12/2004 | Kulmann | 137/625.66 |
| 2004/0047749 A1 | * | 3/2004 | Roberts et al. | 417/395 |

* cited by examiner

AIR VALVE FOR AN AIR DRIVEN RECIPROCATING DEVICE

BACKGROUND OF THE INVENTION

The field of the present invention is reciprocating air driven devices and specifically the air valves therefor.

Reciprocating air driven devices have long had the advantage that they can be employed in circumstances and environments where motors and engines are inappropriate. One area of concern with engines and motors is their use in an environment with combustibles. Sparks and hot manifolds can potentially cause ignition of such combustibles with engines and motors.

Even with air driven devices, as with any operating mechanism, sparks resulting from static charges cannot be ruled out under all conditions. Some of the smaller versions of such air driven mechanisms are now made of engineering plastics rather than conductive metal. Such plastics are typically not conductive and cannot be grounded. Therefore, a mechanism may be warranted to avoid static charge buildup and provide an ability to ground the device.

One mechanism for avoiding the buildup of static charge is to blend a conductive filler into the structural plastic. Carbon and metal fibers are typically considered as fillers for the transformation of plastics from statically insulative to statically dissipative. However, such fillers have been determined to adversely effect the longevity of sealing members required to slide on the filled plastic such as in air valves for driving and controlling such devices.

One such application of plastic for reciprocating air driven devices is for air operated double diaphragm pumps which include reciprocating air valves for the control and driving of the pumps. Valve elements having annular seals thereabout sliding within valve bodies are typically used in such air valves. Such arrangements can encounter the aforementioned seal longevity problem. The following patents illustrate a long line of pumps, air valves therefor and details in the construction thereof, the disclosures of which are incorporated herein by reference:

| RE 38,239 | 6,142,749 | 5,607,290 |
| --- | --- | --- |
| 6,435,845 | 6,102,363 | 5,538,042 |
| 6,357,723 | 5,957,670 | 5,441,281 |
| 6,257,845 | 5,927,954 | 5,362,212 |
| 6,168,394 | 5,746,170 | 4,549,467 |
| 6,158,982 | 5,619,786 | |
| 6,152,705 | 5,611,678 | |

SUMMARY OF THE INVENTION

The present invention is directed to a statically dissipative body for reciprocating air driven devices such as an air valve. A statically insulative liner is located in the bore of the statically dissipative body to provide an advantageous surface upon which sealing components can slide.

In a first separate aspect of the present invention, the statically dissipative body further includes a closure in the bore which is also statically dissipative. The statically insulative liner is fully enclosed by the statically dissipative body and closure. In this way, static charge resulting from the use of statically insulative plastic is shielded or dissipated by the body. Further, an air valve element having annular seals thereabout and other similar elements can advantageously slide against the statically insulative liner. The air valve may be part of an air operated double diaphragm pump.

In a second separate aspect of the present invention, the statically insulative liner in the bore of the statically dissipative body is in locking engagement therewith. The engagement is arranged between laterally extending passages to isolate the passages from one another. The engagement may include annular tenon and mortise structures about the liner.

A third separate aspect of the present invention contemplates the combination of the above separate aspects to greater advantage.

Accordingly, it is an object of the present invention to provide an improved air valve. Other and further objects and advantages will appear hereinafter.

DETAILED DESCRIPTION OF THE PREFERRED EMBODIMENTS

Figure 1:
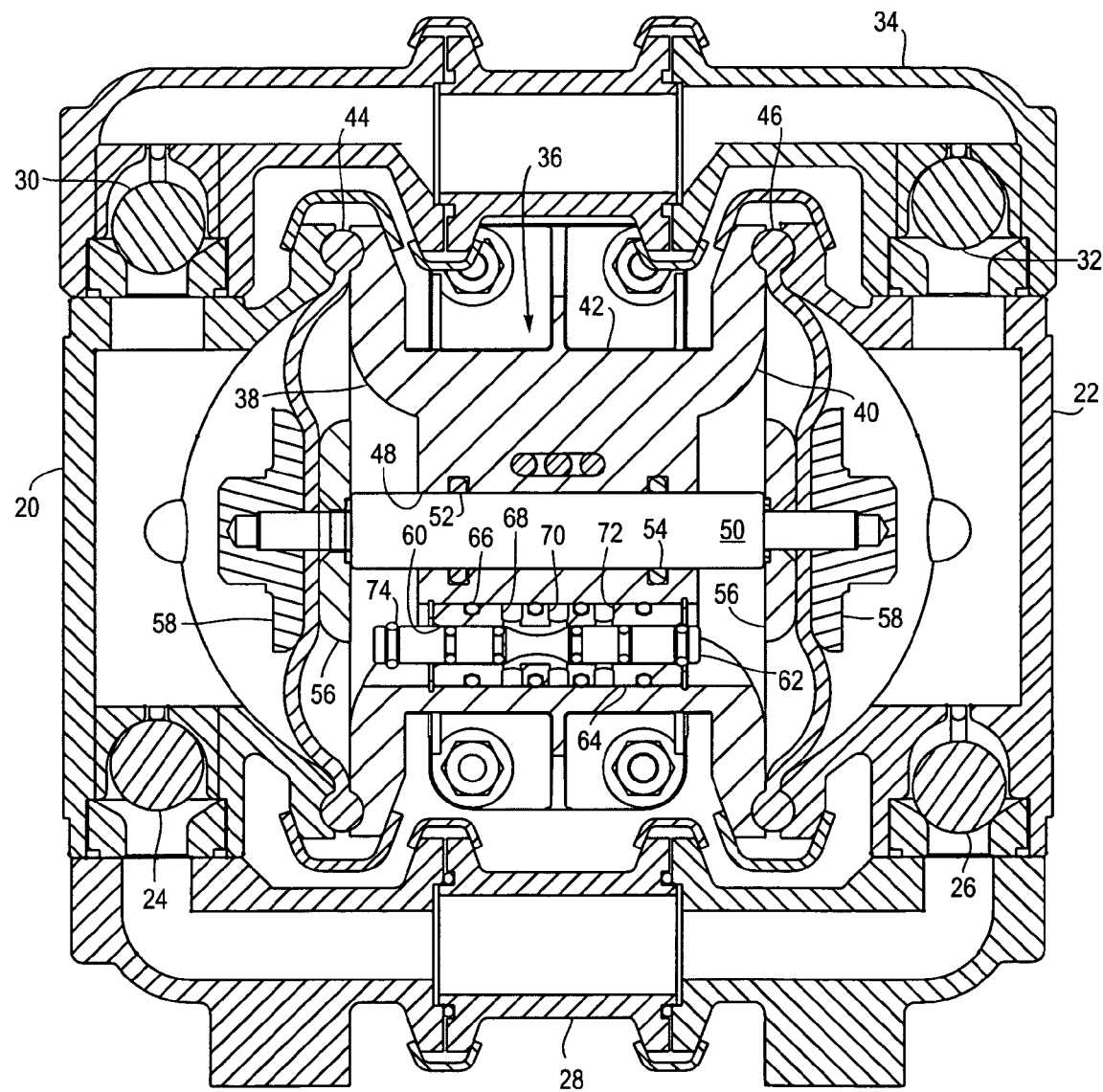
FIG. 1 is a cross-sectional elevation of an exemplar air driven double diaphragm pump.

Turning in detail the drawings, FIG. 1 illustrates an air driven double diaphragm pump shown in cross section for clarity. The pump structure includes two pump chamber housings 20, 22. These pump chamber housings 20, 22 each include a concave inner side forming pumping cavities through which the pumped material passes. One-way ball valves 24, 26 are at the lower end of the pump chamber housings 20, 22, respectively, to provide pump inlet valving. An inlet manifold 28 distributes material to be pumped to both of the one-way inlet valves 24, 26. One-way ball valves 30, 32 are positioned above the pump chambers 20, 22, respectively, and are configured to provide one-way flow in the same direction as valves 24, 26 to provide pump outlet valving. An outlet manifold 34 is associated with the one-way outlet valves 30, 32.

Inwardly of the pump chambers 20, 22, a center section, generally designated 36, includes air chambers 38, 40 to either side of an actuator housing 42. There are two pump diaphragms 44, 46 arranged in a conventional manner between the pump chambers 20, 22 and the air chambers 38, 40, respectively. The pump diaphragms are retained about their periphery between the corresponding peripheries of the pump chambers 20, 22 and the air chambers 38, 40. These pump components, if made of engineering plastic, are preferably statically dissipative through the extensive use of plastic with conductive filler to facilitate grounding of the pump.

The actuator housing 42 provides a first guideway 48 which is concentric with the coincident axis of the air chambers 38, 40 and extends to each air chamber. A shaft 50 is positioned within the first guideway 48. The actuator housing 42 provides annular channels for O-rings 52, 54 as a mechanism for sealing the air chambers 38, 40, one from another along the guideway 48. The shaft 50 includes piston components 56, 58 on each end thereof. These components 56, 58 capture the centers of each of the pump diaphragms 44, 46. The shaft 50 causes the pump diaphragms 44, 46 to operate together to reciprocate within the pump.

Also located within the actuator housing 42 is a second guideway 60 within which a pilot shifting shaft 62 is positioned. The guideway extends fully through the center section to the air chambers 38, 40. The pilot shifting shaft 62 extending through the second guideway 60 also extends beyond the actuator housing 42 to intersect with the travel of the piston components 56. The pilot shifting shaft 62 extends into the path of travel of the inner piston components 56. Thus, as the shaft 50 reciprocates, the pilot shifting shaft 62 is driven back and forth to effect shifting of an air valve element.

The guideway 60 is shown to be defined by a bushing 64. A plurality of O-rings 66 in annular channels in the bushing 64 provide seals between the air chambers 38, 40 as well as between pilot control passages 68, 70, 72. The pilot shifting shaft 62 also employs O-rings 74 to seal along the guideway 60.

Figure 2:
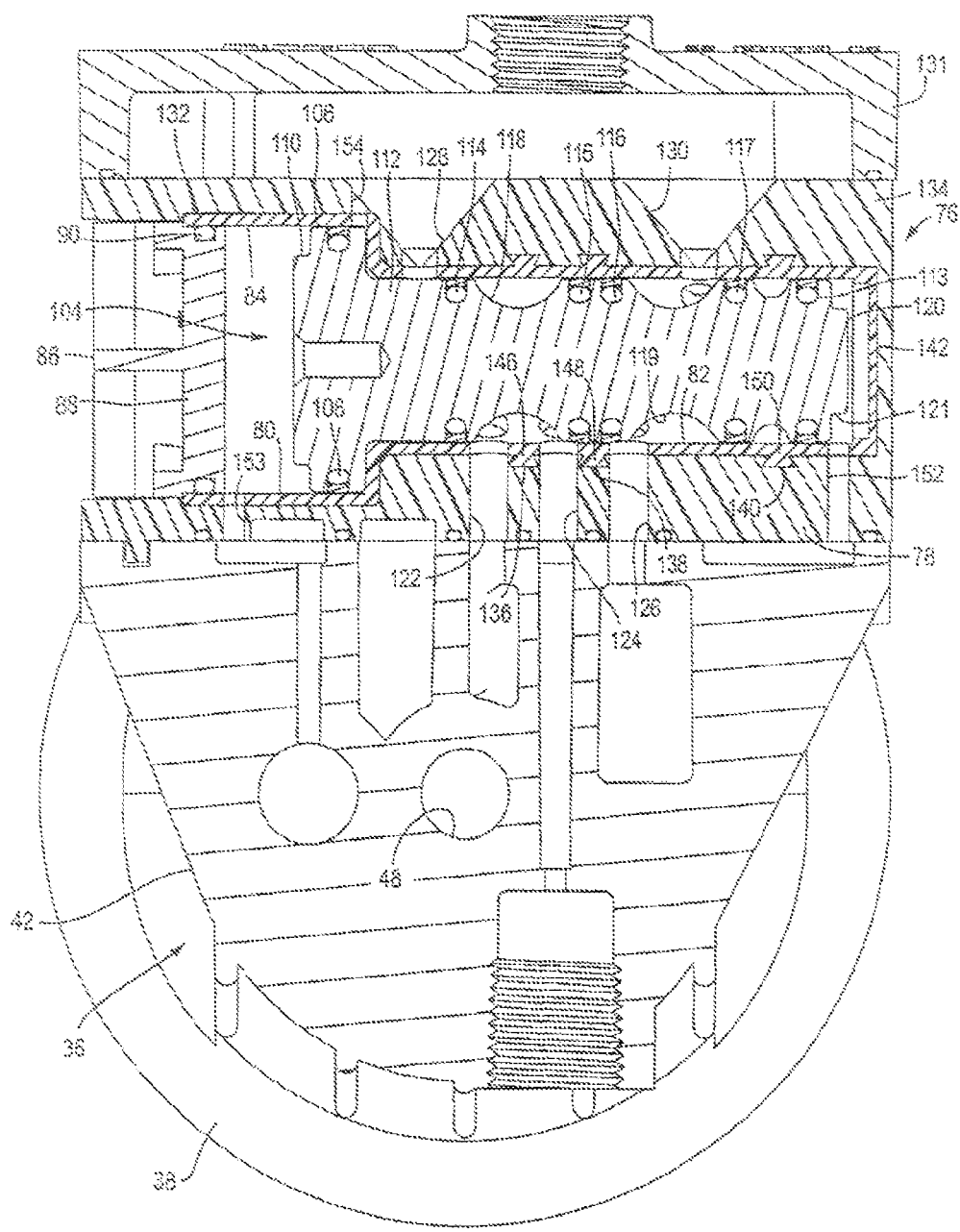
FIG. 2 is a cross-sectional elevation of an air valve and center section of an air driven double diaphragm pump.

Turning to FIG. 2, an air valve, generally designated 76, is associated with the actuator housing 42. The air valve 76 includes a valve cylinder 78. The valve cylinder 78 has a cylindrical bore 80 extending partially therethrough such that the bore 80 is closed at one end by the body of the valve cylinder 78. The cylindrical bore 80 may be divided into two sections, section 82 is of a smaller diameter than section 84. The cylindrical bore 80 is closed at the end of the large section 84 by an end cap 86. The end cap 86 includes a cylindrical plug 88 which extends into the large section 84 of the cylindrical bore 80 and is statically dissipative. An O-ring 90 is arranged about the plug 88 to seal with the cylindrical bore 80.

The air valve 76 includes a valve element, generally designated 104, which is positioned within the valve cylinder 78 in the cylindrical bore 80. The valve element 104 includes a large element end 106 having an annular seal 108 in a receiving channel. The large element end 106 fits closely within the large section 84 of the cylindrical bore 80. A small raised portion 110 ensures an annular space between the end of the valve element 104 and the plug 88 with the valve element 104 positioned toward the large end 106.

The valve element 104 also includes an element body 112 which is smaller in diameter than the large element end 106. The element body 112 includes five annular seals 113, 114, 115, 116 and 117. Between the seals 114 and 115, the element body 112 is reduced in diameter to provide an axial passage 118 for flow of air. The element body 112 includes another axial passage 119 where the diameter is also reduced between the seals 115 and 116. A small element end 120 is defined at the end of the element body 112. The seals 117 seals the bore around the element end 120. A small raised portion 121 on the small element end 120 ensures an annular space at that end with the valve element 104 positioned toward the small end of the cylindrical bore 80.

Several common passages 122, 124, 126 extend from the cylindrical bore 80, the central passage 124 is an inlet and the end passages 122, 126 extend through the center section to the air chambers 38, 40. On the opposite side of the bore 80, exhaust ports 128, 130 extend through the valve cylinder 78. The exhaust ports 128, 130 are tapered to expand to resist ice buildup. A muffler plate 131 defines an expansion chamber and an attachment for a muffler. Each of the passages 122 through 130 extend laterally of the longitudinal direction of the bore. There may be three each of the ports associated with passages 122-130 at the surface of the bore 80.

Looking to the structure of the valve cylinder 78, a liner 132 is located within a valve body 134 to define the bore to receive the valve element 104. The valve body 134 is statically dissipative and is typically of engineering thermoplastic resins, examples of which include polycarbonate, polyethylene, polypropylene, acetal, nylon and others. These thermoplastic resins are typically electrically insulative. To make the valve body 134 statically dissipative, the engineering thermoplastic resins are blended with conductive additives employed for such purposes. Among the possible additives are carbon fiber, carbon powder, stainless steel fiber and nickel fiber. These are conventionally known to be added to such engineering plastic resins in sufficient quantity to make the valve body 134 statically dissipative.

The liner 132 may be made from one of the same engineering thermoplastic resins. However, the conductive fillers added to make the valve body 134 statically dissipative are not included in the liner 132. Consequently, the liner 132 is statically insulative. Without the conductive filler materials, the longevity of the O-ring seals associated with the valve element 104 is greatly enhanced.

The liner 132 of this embodiment conveniently has a wall thickness of 0.100" inches. About the periphery of the liner, annular tenons extend from the liner surface. Three such tenons 136, 138, 140 are illustrated. These tenons 136, 138, 140 are conveniently about 0.065" inches high and have an undercut surface to each side thereof which has an included angle of 60° with the surface of the liner. Conforming to the valve cylinder 78 to facilitate molding processes, the liner 132 may also include a closed end 142. Further, the bore 80 defined by the interior surface of the liner 132 includes a smaller diameter at the closed end and a larger diameter at the open end. The liner 132 extends fully to the end of the bore in the valve body 134. With the placement of at least the one end cap 86 on at least the larger of the two ends, the valve body 134 fully encloses the statically insulative liner 132 with statically dissipative material. As such, the statically insulative liner is shielded from any combustibles within the environment by grounded components of the air valve 76.

The valve cylinder 78 is made by first molding the liner 132. The valve body 134 is then over-molded on the liner 132. In this process, the tenons 136, 138, 140 allow for the molding of material thereabout to solidify into the valve body 134. As such, annular mortises 146, 148, 150 are created through this over-molding process to snugly surround and join with the tenons 136, 138, 140. These interlocking tenon and mortise engagements are presented between the common passages 122, 124, 126. As such, the interocking engagements better seal the passages one from another. Thus, the common passages 122, 124,126 which extend through both the liner 132 and the valve body 134 are separated from one another.

In the manufacture of the air valve 76, the liner is created without the common passages 122, 124, 126 and positioned on a core for the over molding process. The over molding process of the valve body 134 includes core pins which extend to press against the liner and retain the liner in place on the core. Once removed from the molding process, the valve cylinder 78 is further machined to achieve the required surfacing for the bore of the liner and to port and debur the common passages 122, 124, 126 as well as the exhaust ports 128, 130, pilot ports 152, 153 and relief port 154.

Thus, an improved air valve having a statically dissipative effect has been shown and described. All embodiments in the application of this invention have been shown and described, it would be apparent to those skilled in the art that many more modifications are possible without departing from the inventive concepts herein. The invention, therefore, is not to be restricted except in the spirit of the appended claims.

What is claimed is:

1. An air valve for a reciprocating air driven device, comprising;
    a statically dissipative body including a bore therein;
    a statically insulative liner in the bore;
    at least one statically dissipative closure, the statically insulative liner being fully enclosed by the statically dissipative body and the at least one statically dissipative closure;

a valve element longitudinally and rectilinearly movably mounted in the bore and including resilient O-ring seals thereabout in sliding contact with the liner, the statically dissipative body and the statically insulative liner including at least one inlet extending to and at least one outlet extending from the valve element laterally of the bore, the statically insulative liner and the statically dissipative body being in interlocking sealing engagement about a circumference of the liner between the at least one inlet and the at least one outlet and being of the same thermoplastic resin with the thermoplastic resin of the statically dissipative body being blended with conductive filler.

* * * * *